(12) United States Patent
Mechaley, Jr.

(10) Patent No.: US 8,027,667 B2
(45) Date of Patent: Sep. 27, 2011

(54) SYSTEM AND METHOD FOR WIRELESS COUPON TRANSACTIONS

(75) Inventor: Robert G. Mechaley, Jr., Kirkland, WA (US)

(73) Assignee: Mobilesphere Holdings LLC, Kirkland, WA (US)

( * ) Notice: Subject to any disclaimer, the term of this patent is extended or adjusted under 35 U.S.C. 154(b) by 164 days.

(21) Appl. No.: 11/427,611

(22) Filed: Jun. 29, 2006

(65) Prior Publication Data
US 2008/0003987 A1 Jan. 3, 2008

(51) Int. Cl.
H04M 3/42 (2006.01)
(52) U.S. Cl. .................. 455/414.1; 455/421; 455/435.1; 455/444; 455/466; 705/14.1; 705/14.4; 705/16; 705/26.1; 725/23
(58) Field of Classification Search ............... 705/14, 705/17, 26, 27, 44, 14.1, 26.1, 27.1, 14.4, 705/16; 455/414.4, 466, 414.1, 421, 432.3, 455/435.1, 444; 725/23
See application file for complete search history.

(56) References Cited

U.S. PATENT DOCUMENTS

| | | | | |
|---|---|---|---|---|
| 5,855,007 A * | 12/1998 | Jovicic et al. | | 705/14 |
| 6,836,667 B1 * | 12/2004 | Smith, Jr. | | 455/456.1 |
| 6,869,013 B2 * | 3/2005 | Allen et al. | | 235/381 |
| 7,107,221 B1 * | 9/2006 | Tracy et al. | | 705/1 |
| 7,152,040 B1 * | 12/2006 | Hawthorne et al. | | 705/16 |
| 7,343,317 B2 * | 3/2008 | Jokinen et al. | | 705/14 |
| 2002/0095337 A1 * | 7/2002 | Velthuis et al. | | 705/14 |
| 2002/0123359 A1 * | 9/2002 | Wei et al. | | 455/466 |
| 2003/0004808 A1 | 1/2003 | Elhaoussine et al. | | |
| 2003/0115152 A1 | 6/2003 | Flaherty | | |
| 2004/0044554 A1 * | 3/2004 | Bull et al. | | 705/8 |
| 2004/0117254 A1 * | 6/2004 | Nemirofsky et al. | | 705/14 |
| 2004/0137886 A1 * | 7/2004 | Ross et al. | | 455/414.1 |
| 2004/0203892 A1 | 10/2004 | Cole | | |
| 2004/0215510 A1 * | 10/2004 | Wilkie | | 705/14 |
| 2005/0177517 A1 * | 8/2005 | Leung et al. | | 705/64 |
| 2005/0228719 A1 * | 10/2005 | Roberts et al. | | 705/14 |
| 2006/0223556 A1 * | 10/2006 | Xu et al. | | 455/502 |
| 2007/0259660 A1 * | 11/2007 | Stein et al. | | 455/426.1 |
| 2008/0046258 A1 * | 2/2008 | Mechaley | | 705/1 |
| 2008/0249983 A1 * | 10/2008 | Meisels et al. | | 707/3 |

* cited by examiner

Primary Examiner — Dwayne Bost
Assistant Examiner — Inder Mehra
(74) Attorney, Agent, or Firm — Michael J. Donohue; Davis Wright Tremaine LLP

(57) ABSTRACT

A system and method for delivering coupon messages to a consumer wireless device utilizes a fixed communication device that functions as a base station for the consumer wireless device. The fixed communication device has limited coverage zone. When the consumer wireless device comes within the coverage zone of the fixed communication device, the consumer wireless device selects the fixed communication device as the preferred base station. Upon completion of registration, the fixed communication device transmits one or more coupon messages to the consumer wireless device. The consumer may enter the associated retail establishment and complete a transaction using the received coupon message. The consumer wireless device may be viewed manually, or the display scanned or read electronically to accept the coupon message in the retail establishment.

38 Claims, 5 Drawing Sheets

SYSTEM AND METHOD FOR WIRELESS COUPON TRANSACTIONS

BACKGROUND OF THE INVENTION

1. Field of the Invention

The present invention is directed generally to wireless communications and, more particularly, to a system and method for wireless communication involving the transmission of coupon data for retail transactions.

2. Description of the Related Art

Cellular telephones, personal communication system (PCS) devices, personal digital assistants (PDA) and other forms of wireless communications are ubiquitous. Many individuals have one or more of these communication devices. In some embodiments, multiple functionalities are incorporated into a single device. For example, it is known to combine a wireless telephone with a PDA.

Some wireless devices also allow user access to a computer network, such as the Internet. With Internet access, the user can obtain significant amounts of information, such as directions, retail store locations/hours, and the like. While Internet access through a wireless device provides significant amounts of information, it does not permit a specific retail store to provide information directly to the consumer. Such direct communication can be a benefit to both the consumer and the retail facility. Therefore, it can be appreciated that there is a significant need for a system and method that allows direct communication between a retail facility and the consumer. The present invention provides this, and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

The system and method described herein utilizes existing wireless communication frequencies licensed for wide-area wireless networks. One component of the system resides in a retail facility. The operation of the retail facility system will be described in greater detail below. The other portion of the system is a consumer wireless device. The device may be a cell phone, PCS device, PDA device, or the like. These conventional devices operate at assigned frequencies. For example, some cell phones operate in the 800 MHz band while PCS devices operate in the 1.9 GHz band. Some devices are multimode and can operate in an analog mode or a digital mode and are capable of operating in different frequency bands. The assigned frequency bands are licensed for wide area telecommunications. The techniques described herein operate in those licensed bands and communicate with the various consumer devices in a manner consistent with normal operation of those devices. For the sake of convenience, the various devices will be generically described as a consumer wireless device.

Figure 1:
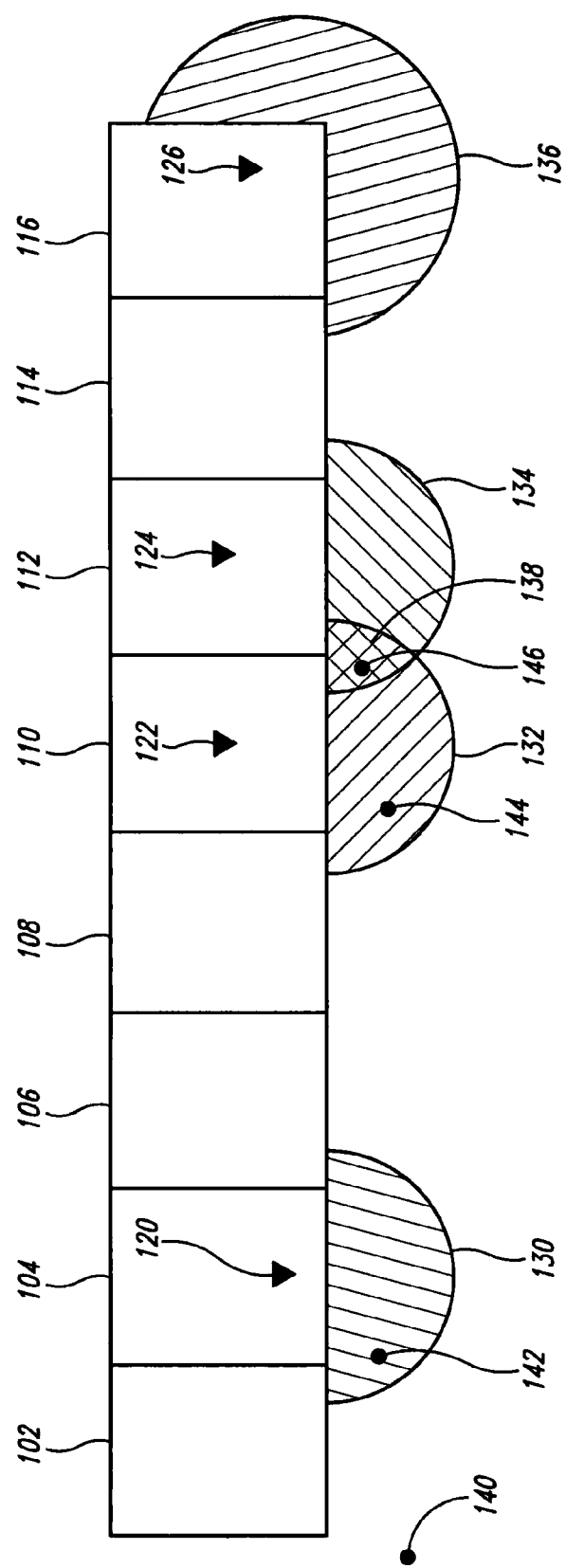
FIG. 1 is a schematic illustration of multiple retail outlets and coverage zones for communication devices contained therein.

FIG. 1 is a schematic illustrating the operation of a system 100 to implement the techniques described herein. FIG. 1 illustrates a plurality of retail facilities 102-116. FIG. 1 illustrates the retail facilities 102-116 in a linear arrangement, as is common in a strip mall arrangement. Those skilled in the art will appreciate that this is for convenience in an illustration only. For example, in a typical shopping mall, the retail facilities 102-116 may line both sides of a wide central aisle. In addition, a retail facility may reside in a kiosk in the center of the central aisle. Thus, the system 100 is not limited to the strip-mall arrangement illustrated in FIG. 1. Furthermore, the retail facilities 102-116 may be indoor, such as the example of an enclosed mall or arcade or outdoors, as in the example of a strip mall.

As illustrated in FIG. 1, some of the retail facilities have an associated fixed communication device, which is typically located within the physical confines of the retail facility. In FIG. 1, the retail facility 104 has a fixed communication device 120 while the retail facilities 110, 112, and 116 each have respective fixed communication devices 122-126. The low power transmitter and short range antenna may typically be housed in a small portable package. However, the term "fixed communication device," as used herein, refers to the fact that the device is typically stationary during operation rather than any reference to its size or relative portability. Each of the fixed communication devices 120-126 are configured to have very short range communication capabilities.

FIG. 1 illustrates a coverage zone 130 associated with the fixed communication device 120. Similarly, the communication devices 122-126 have associated coverage zones 132-136, respectively. FIG. 1 illustrates the coverage zones 130-134 as having a semi-circular coverage pattern. However, those skilled in the art will appreciate that different configurations are possible. For example, if the retail facility 104 is implemented as a kiosk in a center aisle, the fixed communication device 120 may be configured to have a coverage zone 130 having a circular pattern rather than the semi-circular pattern illustrated in FIG. 1. Similarly, the retail facility 116 may be located at a corner in a shopping mall. In this event, the coverage zone 136 may extend beyond a semi-circular pattern to allow a greater coverage zone. The specific pattern of the coverage zones 130-136 are readily configurable to accommodate the physical location of the retail facility. In some cases, the coverage zones may have a certain degree of overlap. For example, the coverage zones 132 and 134 form an overlapping coverage zone 138. Finally, FIG. 1 illustrates the coverage zones 130-136 in a two-dimensional form. Those skilled in the art will appreciate that the actual coverage zone is three-dimensional in nature. However, for simplicity and ease in understanding, the coverage zones 130-136 are merely illustrated in the two-dimensional form of FIG. 1.

The fixed communication devices 120-126 also have configurable coverage ranges by controlling transmission power. For example, the coverage zones 130-134 are approximately equal in size while the coverage zone 136 has a greater range. In a typical implementation, the range of the coverage zone is adjusted so that it may extend in a desired pattern along the store front.

FIG. 1 also illustrates sample positions of a plurality of consumer wireless devices 140-146. Those skilled in the art will appreciate that the sample locations illustrated in FIG. 1 are temporary. As consumers walk along the street or aisle way of a shopping mall, they walk into and out of the coverage zones 130-136. For example, FIG. 1 illustrates a consumer wireless device 140 that is not within any of the coverage zones 130-136. The consumer wireless device 142 is within the coverage zone 130 while the consumer wireless device 144 is within the coverage zone 132. The consumer wireless device 146 is located within the overlapping coverage zone 138 formed by the overlap of coverage zones 132 and 134.

As the consumer wireless devices move into one of the coverage zones 130-136, the consumer wireless device will begin to communicate with the respective fixed communication devices 120-126. The various elements of the system 100 may now be described in greater detail.

Figure 2:
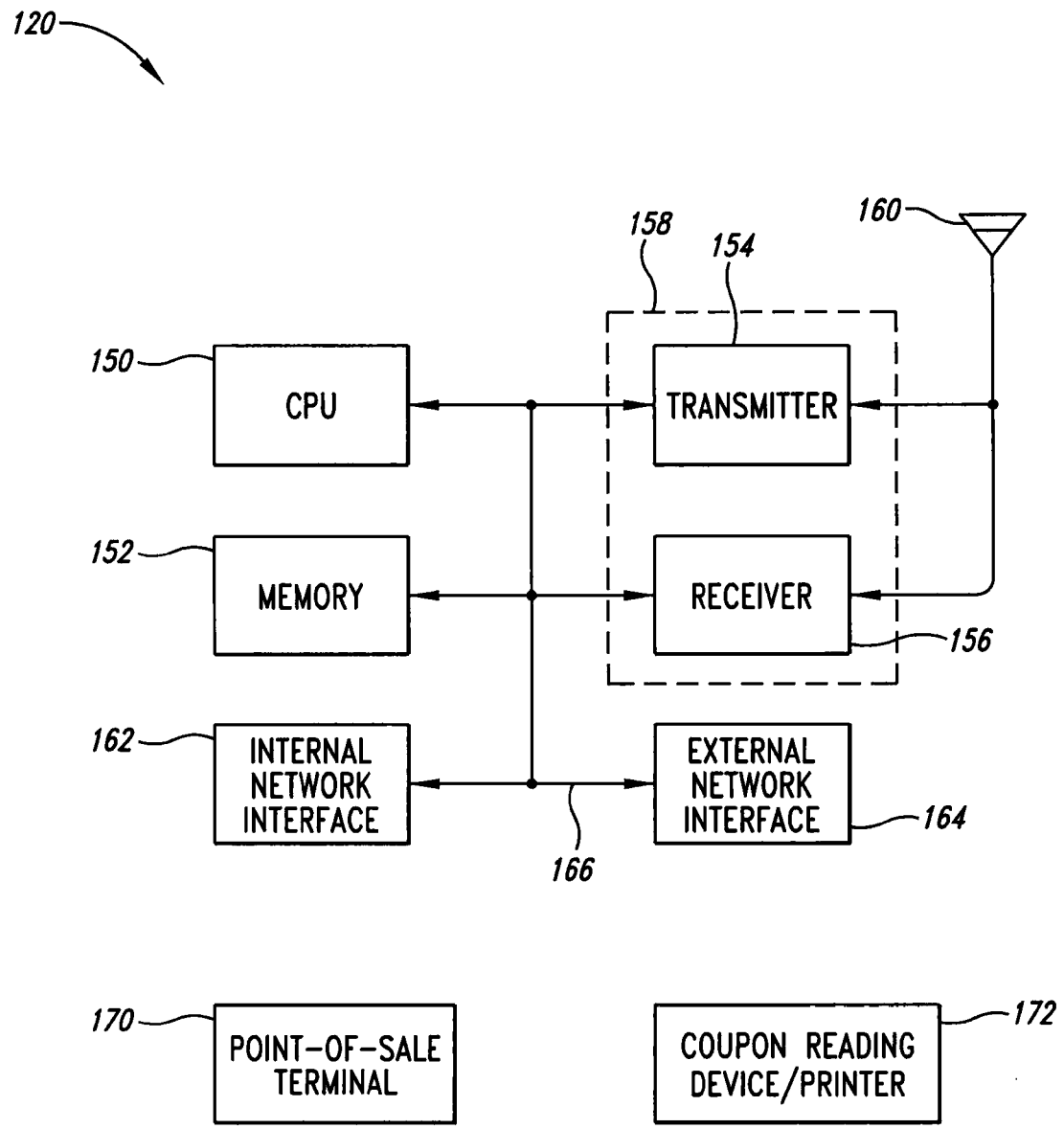
FIG. 2 is a functional block diagram of a fixed communication device positioned within a retail facility.

FIG. 2 is a functional block diagram of the fixed communication device 120. Those skilled in the art will appreciate that the fixed communication devices 122-126 are essentially identical in manner except for configuration parameters, such as the coverage pattern of the coverage zones, power of transmission levels, and the like. However, these operational parameters are readily understood by those skilled in the art and need not be described in greater detail herein.

The fixed communication device 120 comprises a central processing unit 150 and a memory 152. In general, the CPU 150 receives instructions and data from the memory 152 and executes those instructions. The CPU 150 may be implemented as a conventional microprocessor, microcontroller, programmable gate array, discrete circuit, application-specific integrated circuit (ASIC), or the like. The system 100 is not limited by the specific implementation of the CPU 150. Similarly, the memory 152 may be implemented by a variety of known technologies. The memory 152 may include dynamic memory, static memory, programmable memory, or the like. A portion of the memory 152 may be integrated into a single chip with the CPU 150. The system 100 is not limited by any specific implementation of the memory 152.

The block diagram of FIG. 2 also illustrates a transmitter 154. As will be described in greater detail below, the transmitter 154 transmits data to the consumer wireless devices that come within its coverage zone. As will be described in greater detail below, the transmitter 154 transmits a coupon message to consumer wireless devices that come within it coverage zone.

FIG. 2 also illustrates a receiver 156. As will be described in greater detail below, the receiver 156 is configured to receive data transmitted by one or more of the consumer wireless devices. The receipt of data from the consumer wireless device by the receiver 156 can serve as a verification that the consumer wireless device has received data from the transmitter 154 and is thus capable of two-way communication with the fixed communication device 120. Those skilled in the art will appreciate that the transmitter 154 and receiver 156 may have common circuitry and be implemented as a transceiver 158.

The transmitter 154 and receiver 156 are coupled to an antenna 160. The antenna 160 may be implemented using a variety of known designs, such as omnidirectional antennas, directional antennas, phased-array antennas, and the like. As described above, the antenna coverage pattern may be adjusted in a known fashion to provide a desired pattern that may be uniquely configured for each coverage zone 130-136.

FIG. 2 also illustrates optional components, such as an internal network interface 162 and an external network interface 164. The optional network interfaces may provide additional data for the fixed communication device 120. For example, the internal network interface 162 allows the fixed communication device 120 to communicate with an in-store network. The in-store network may include, for example, a database containing a list of items currently on sale. The fixed communication device 120 may transmit coupon data relating to the sale items to any consumer wireless device that comes within range of the fixed communication device.

The optional external network interface 164 may provide similar data. This may be an effective implementation if the fixed communication device 120 is located in a retail facility that is part of a larger chain of stores. In this manner, a chain-wide sale may be conducted with the same data (e.g., data related to sales items) across the entire chain.

In an alternative embodiment, the internal network interface 162 or external network interface 164 may allow access to data relating to specific consumers. For example, the fixed communication device 120 may identify a specific consumer based on the identification of a particular consumer wireless device. The coupon data transmitted by the fixed communication device 120 may be specifically tailored to the individual likes and dislikes of the consumer whose consumer wireless device has been uniquely identified.

The various components illustrated in FIG. 2 are coupled together by a bus system 166. The bus system 166 may include a power bus, address bus, control bus, data bus, and the like. For the sake of convenience, these various buses are illustrated in FIG. 2 as the bus system 166.

FIG. 2 also illustrates a point-of-sale terminal 170 and a coupon reading device/printer 172. Although these components are not part of the fixed communication device 120, they may be coupled to the fixed communication device via the internal network interface 162. As will be described in greater detail below, the coupon reading device/printer may be used to read the coupon message from the consumer wireless device and, optionally, to print the coupon for use in the store. The point-of-sale terminal 170 may be used to complete the transaction, particularly if the transaction involves a sale to the consumer.

Figure 3:
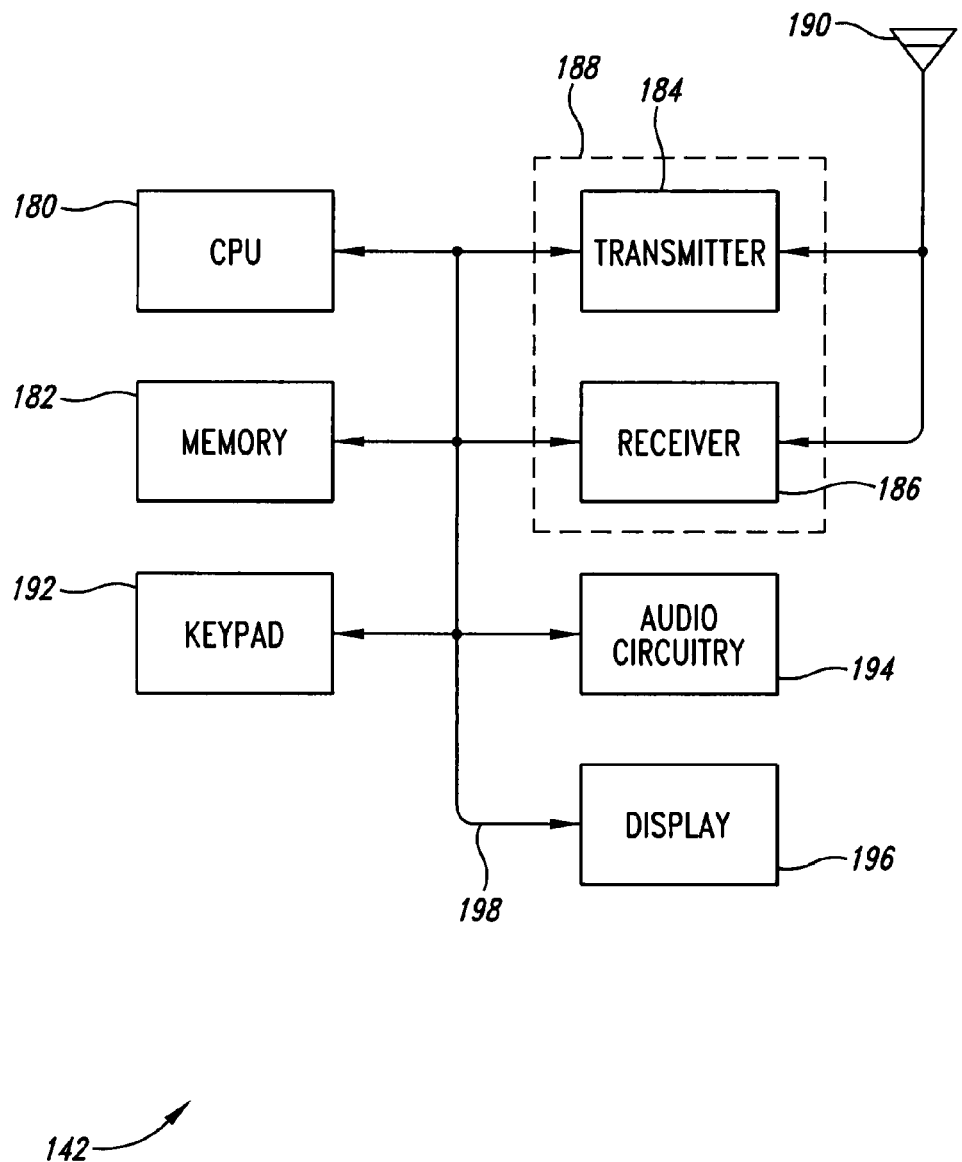
FIG. 3 is a functional block diagram of a portable wireless communication device.

FIG. 3 is an example functional block diagram of the consumer wireless device 142. Those skilled in the art will appreciate that the other consumer wireless devices 140 and 144-146 contain similar circuitry and operate in a functionally identical manner. Details of each of the consumer wireless devices 140-146 are not necessary.

As illustrated in FIG. 3, the consumer wireless device 142 contains many components similar to those described above with respect to the fixed communication device 120. Specifically, the consumer wireless device 142 includes a CPU 180 and a memory 182. In general, the CPU 180 obtains data and instructions from the memory 182 and executes those instructions. The CPU 180 may be implemented by a number of devices, such as those described with respect to the CPU 150. Similarly, the memory 182 may be implemented in a variety of known technologies, such as those described above with respect to the memory 152.

The consumer wireless device 142 also includes a transmitter 184 and a receiver 186. As is known in the art, the receiver 186 of the consumer wireless device 142 searches for a base station with which to communicate. In some implementations of a wireless communication system, the consumer wireless device 142 may communicate with multiple base stations. In the system 100, the fixed communication devices 120-126 function as base stations to permit two-way communication between the consumer wireless device 142 and one or more of the fixed communication devices. In one embodiment, one or more of the fixed communication devices 120-126 may function as a "pseudo-base station," which may mimic the operation of a base station, but which is not actually connected to the service provider for the wireless communication system. In an alternative embodiment, one or more of the fixed communication devices 120-126 may be coupled to the service provider via the external network interface 164. In this embodiment, the fixed communication devices 120-126 have the same functionality as any base station for that particular service provider.

In some implementations, the receiver 186 searches for the "best" base station based on factors, such as signal strength, signal quality, or a selection parameter preprogrammed into the consumer wireless device 142. When the consumer wireless device locates a base station with which to communicate, the transmitter 184 transmits appropriate handshake signals to establish a two-way communication link between the consumer wireless device 142 and the fixed communication device 120.

In some implementations, the transmitter 184 and the receiver 186 share common circuitry and may be implemented as a transceiver 188. The transmitter 184 and receiver 186 are coupled to an antenna 190. Unlike the directional beam pattern of the antenna 160, the antenna 190 of the consumer wireless device is often implemented as an omnidirectional dipole antenna to provide the greatest possibility of detecting a suitable base station with which to communicate.

The consumer wireless device 142 also includes circuitry that is not required for implementation of the fixed communication device 120. For example, the consumer wireless device 142 includes a keypad 192, audio circuitry 194 and a display 196. The keypad 192 may be a typical wireless communication device keypad to permit the user to enter telephone numbers, and otherwise control the consumer wireless device 142. The audio circuitry 194 may include a microphone and speaker to allow two-way voice communications between the user and other portions of a wireless communication network. The display 196 may be a monochromatic or color display to provide the consumer with operational information. As implemented in the system 100, the display 196 may be readily used to provide the consumer with a visual display of coupon data transmitted to the consumer wireless device 142 by the fixed communication device 120.

The various components illustrated in FIG. 3 are coupled together by a bus system 198. The bus system 198 may include a power bus, address bus, control bus, data bus, and the like. For the sake of convenience, these various busses are illustrated in FIG. 3 as the bus system 198.

In an exemplary embodiment, the fixed communication devices 120-126 are capable of two-way data communications. For example, some communications systems employ short message service (SMS) capabilities in communications with the consumer wireless devices 140-146 along with their associated display capabilities.

As a person carrying one of the consumer wireless devices 140-146 moves into a coverage zone 130-138, the consumer wireless device detects the corresponding fixed communication device as the "best" base station. As previously noted, the selection of the best base station may be based on one or more factors, such as signal strength, signal quality, or a selection parameter preprogrammed into the consumer wireless device, taken alone or in combination. For example, as the consumer carrying the consumer wireless device 142 moves into the coverage zone 130, the consumer wireless device detects the fixed communication device 120 and selects that fixed communication device as the best base station.

When the consumer wireless device detects the fixed communication device 120, the consumer wireless device registers or associates with that fixed communication device. In a typical CDMA wireless communication network, the transmitter 154 of the fixed communication device 120 transmits a pilot signal for detection by any consumer wireless device. In this example embodiment, it is the pilot signal is transmitted over the coverage zone 130. As the consumer wireless device 142 moves within the coverage zone 130, the receiver 186 (see FIG. 3) detects the transmitted pilot signal from the fixed communication device 120. The consumer wireless device 142 will register or associate with the fixed communication device 120. As part of the registration process, the consumer wireless device 142 transmits identification data, which may uniquely identify that consumer wireless device. Other wireless communication networks utilize control channels rather than a pilot signal, to locate a base station. Those skilled in the art will appreciate that the principles described herein are applicable to any wireless communication network to detect a base station.

Upon completion of the registration process, the fixed communication device 120 may utilize the internal network interface 162 (see FIG. 2) or the external network interface 164 to query whether the identified consumer wireless device 142 should receive a coupon message. In this example implementation, the internal or external network provides a response to the query. If the response to the query indicates that a coupon message should be transmitted, the network (i.e., the internal network or external network) may also provide a coupon message from a network storage location (not shown).

In an alternative embodiment, the fixed communication device 120 may transmit a coupon message to the consumer wireless device 142 without the lookup query process. In this embodiment, the coupon message may be retrieved from local storage, such as the memory 152 or other storage device (not shown) for transmission to the consumer wireless device 142. Data for the coupon message may be stored in a predetermined format ready for the transmitter 154 to transmit to the consumer wireless device 142. Alternatively, the coupon data may be formatted into a coupon message by the fixed communication device 120.

In addition to the optional query process described above, other optional processes may also be performed by the system 100. In one embodiment, the consumer wireless device 142 transmits an acknowledgement message to the fixed communication device 120 to confirm that the coupon message has been received. The fixed communication device 120 may transmit one or more coupon messages to the consumer wireless device 142.

Figure 4:
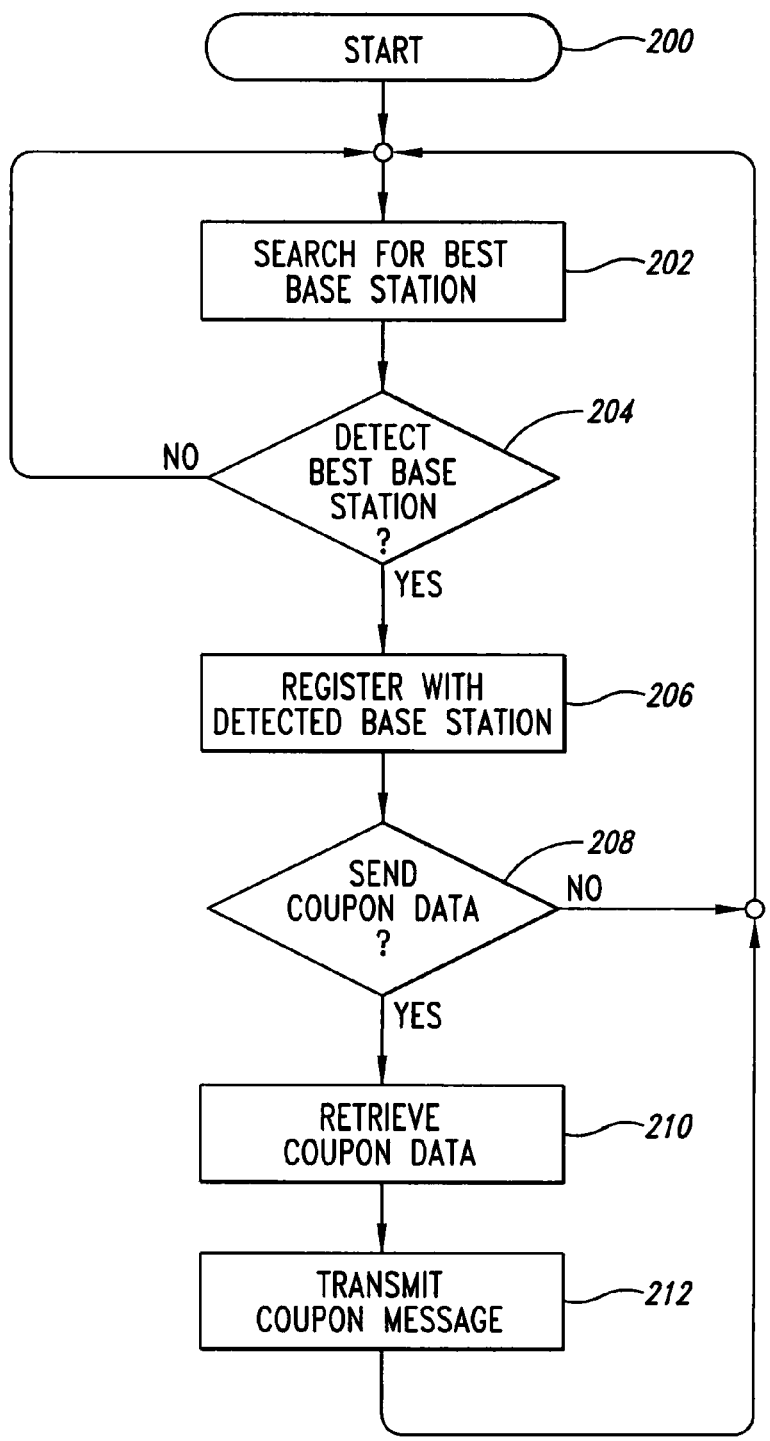
FIG. 4 is a flow chart illustrating the operation of the system to transmit coupon data to a wireless communication device.

The transmission process performed by the system 100 is illustrated, in one embodiment, in the flow chart of FIG. 4. At a start 200, the fixed communication device 120 (see FIG. 1) is active and awaiting registration request from any consumer wireless devices that are within the coverage zone 130. As noted above, some wireless communication systems transmit a pilot signal from the base station. In this embodiment, the fixed communication device 120 would broadcast such a pilot signal. The consumer wireless devices continuously perform a background operation in which the wireless communication device searches for the best base station with which to communicate. In step 202, the consumer wireless device 142 searches for the best base station.

In decision 204, the consumer wireless device 142 determines whether it has detected the best base station (i.e., better than the current base station with which the consumer wireless device is communicating) with which to communicate. If the result of decision 204 is NO, the process returns to step 202 and the search for the best base station continues.

If the consumer wireless device 142 detects the fixed communication device 120 as the best base station, the result of decision 204 is YES. In that event, at step 206, the consumer wireless device 142 registers with the selected base station. In the implementation of the system 100 the consumer wireless device 142 registers with the fixed communication device 120. Those skilled in the art will appreciate that this process is repeated for other consumer wireless devices and fixed communication devices illustrated in FIG. 1. For example, the consumer wireless device 144 would register with the fixed communication device 122. The consumer wireless device 146, which is located in the overlapping coverage zone 138, is capable of communication with the fixed communication device 122 and the fixed communication device 124. In one embodiment, the wireless communication device 146 selects one of the fixed communication devices 122-124 with which to communicate. Alternatively, it is known that wireless communication devices may communicate with multiple base stations. In this embodiment, the consumer wireless device 146 can communicate with both the fixed communication device 122 and the fixed communication device 124.

The registration process performed between the consumer wireless device and the fixed communication device may depend on the particular communication network. However, registration processes for various wireless communication networks are known in the art and need not be described in greater detail herein.

Upon completion of the registration process, the fixed communication device (e.g., the fixed communication device 120 of FIG. 1) may optionally perform a query to determine whether a coupon message should be transmitted to the consumer wireless device (e.g., the consumer wireless device 142). If the result of decision 208 is NO, the fixed communication device 120 will not transmit a coupon message and the process continues at step 202.

If the result of decision 208 is YES, the fixed communication device 120 retrieves coupon data in step 210. As discussed above, the coupon data may be stored locally in the memory 152 (see FIG. 2) or retrieved from an in-store computer network via the internal network interface 162 or retrieved from an external network via the external network in interface 164. When the coupon data has been retrieved, the fixed communication device 120 formats the coupon data into a an appropriate format for transmission and transmits a coupon message to the consumer wireless device 142 at step 212. Upon completion of transmission of the coupon message, the system 100 returns to step 202.

The fixed communication device 120 may also retain a log in the memory 152 or a different location, such as a storage device on the in-store network (not shown). The log is used to list coupon messages that have or already been transmitted to a particular consumer wireless device (e.g., the consumer wireless device 142). In this manner, the system 100 prevents the transmission of multiple repeat coupon messages to the same consumer wireless device. The log has associated time limits and need not retain the data for long periods of time. For example, the log may automatically expire after a predetermined time period, such as 30 minutes. In this manner, the consumer would not be inundated with multiple repeats of the same message, but would receive a new coupon message when the consumer wireless device enters the coverage zone after the expiration of the predetermined time period.

The log may also be used if the fixed communication device 120 transmits multiple different data coupon messages to the consumer wireless device 142. The log stores data identifying each of the coupon messages to prevent multiple transmissions of identical messages and to assure that the consumer has received one copy of all available coupon messages.

Upon receipt of the coupon message, the consumer wireless device 142 delivers the coupon message content to the display 196 (see FIG. 3). The consumer wireless device 142 may also generate a notification that a coupon message has arrived. The notification may be in the form of an audio signal delivered by the audio circuitry 194, such as a beep. Alternatively, the consumer wireless device 142 may contain a vibration device (not shown) to vibrate when a coupon message is received. In yet another alternative, the display 196 may contain an indication that a coupon message has bee received. The consumer may activate a key or keys on the keypad 192 to retrieve and display the received coupon message. Alternatively, a special function button, such as a voicemail button, can be programmed to retrieve and display the received coupon message.

Upon notification, the consumer may take one or more steps. In one embodiment, the consumer may simply ignore the coupon message. The received coupon message may be automatically stored in the memory 182 for subsequent retrieval if the consumer wireless device 142 is configured to automatically store received messages. As noted above, the coupon message may be in the form of an SMS communication. The SMS communication may be stored in the memory 182. Alternatively, the user may manually store the received coupon message in the memory 182 if the consumer wireless device 142 is configured for such data storage. Automatic or manual storage allows the user to retain the coupon message for subsequent use.

Figure 5:
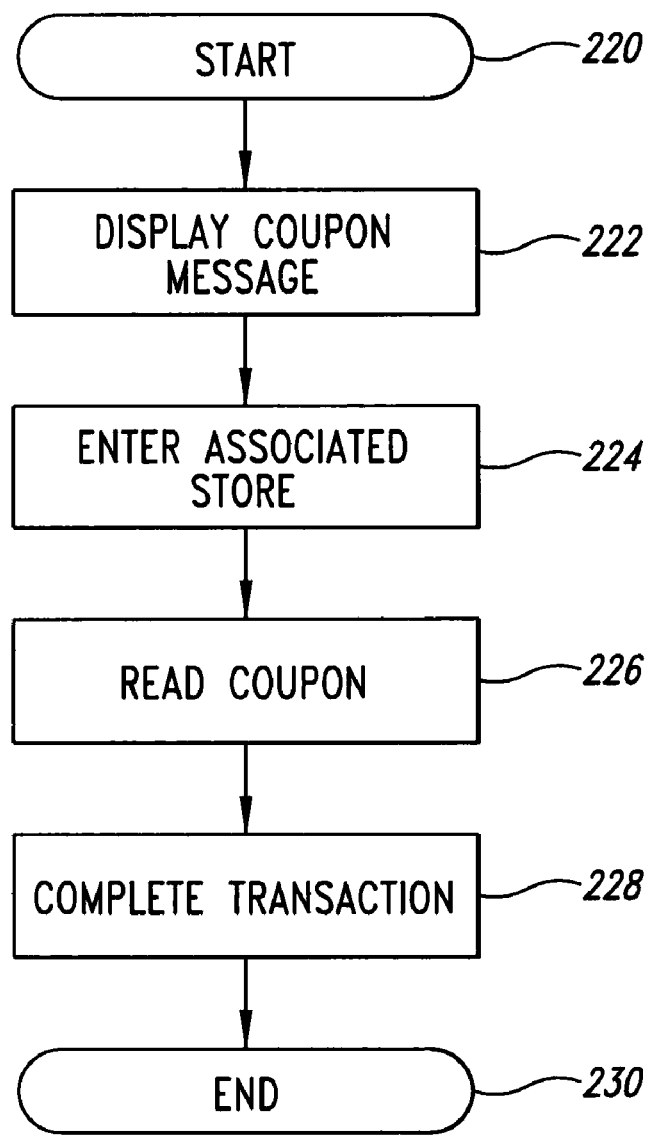
FIG. 5 is a flow chart illustrating the operation of the system for coupon redemption within a retail facility.

At some point in time, the user may read the received coupon message. Upon reading the coupon message, the user may take no action or enter the store offering the coupon. If the user takes no action, the message may be automatically stored in the memory 182 of the consumer wireless device 142, as described above. This may include automatically storing the received coupon message or manually storing the coupon message. Alternatively, the user may delete the coupon message if there is no interest in the products/services described in the coupon message. The process for engaging in a transaction using the coupon message is illustrated in the flowchart of FIG. 5 where at a start 222, a coupon message has been received by the consumer wireless device (e.g., the consumer wireless device 142). At step 222, the coupon message is shown on the display 196 of the consumer wireless device 142. At step 224, the user enters the store associated with the received coupon message.

If the user decides to use the coupon, the user may show the display 196 of the consumer wireless device 142 to store personnel. The coupon message is "read" by the coupon reading device/printer 172 (see FIG. 2). This process may be performed manually or automatically, depending on the implementation of the coupon reading device/printer 172. The coupon message may be manually reviewed by store personnel and the offer applied to a transaction. It should be noted that the transaction may or may not involve an actual purchase. For example, the coupon message may include a discount on a purchase, or may relate to an offer for a free product sample. Thus, the term "transaction" need not require an actual purchase by the user.

Alternatively, the coupon message on the display 196 may also be scanned by optical or electrical means using the coupon reading device/printer 172 and applied to a transaction. In yet another alternative embodiment, the coupon message may be printed by the coupon reading device/printer 172. The printed version of the coupon message may then be applied to a transaction.

The coupon message may contain unique identification data, such as a numeric code, bar code, or other symbology. For example, a bar code on the display 196 may be scanned at a point-of-sale terminal and applied to a transaction.

In step 228, the user completes the transaction and the process ends at 230. Thus, the coupon message is delivered to the consumer wireless device as the consumer passes in proximity to the associated retail facility.

The coupon message itself can include many forms of offers. For example, the offer may be a specific amount deducted from a transaction (e.g., $10 off list price) or a relative amount to be deducted from a transaction (e.g., 20% off list price). As noted above, the coupon message may also include an offer of free or reduced priced merchandise. The coupon message may also include a general offer. For example, the consumer may be requested to participate in a survey and provided with a free gift upon completion of the survey. Thus, those skilled in the art will appreciate that the coupon message itself may have endless variations.

The coupon message shown on the display 196 may also include terms and conditions. For example, the coupon message may have a limited duration. The duration may be relatively long, as may be common in a retail outlet having a sale that lasts, by way of example, a week. The coupon message may include offers of a shorter duration, such as a day, or even an hour. The fixed communication device 120 contains an internal clock (not shown). The expiration time may be calculated using the clock in the fixed communication device 120 so that the expiration date and/or time is included in the coupon message and shown on the display 196.

Thus, the communication system 100 comprises short range base stations that communicate with conventional consumer wireless devices to transmit coupon messages when the consumer wireless device moves to within a short range coverage zone, which is typically in an area proximate the retail facility. This process allows retail facilities to communicate directly with consumers and to provide useful information in the form of coupon messages to consumers who pass near the retail facility.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A retail coupon system for use with a wireless cellular communication device using a communication protocol for wide-area wireless networks and operating on frequencies licensed for wide-area wireless networks, the system comprising:

a retail facility open to consumers;

a transmitter associated with the retail facility and located proximate the retail facility, the transmitter configured to function as a wireless network base station having a limited transmission range on the licensed frequencies and to transmit data communications to the wireless cellular communication device;

a receiver associated with the retail facility to receive data communications from the wireless cellular communication device;

an antenna operatively coupled to the transmitter and the receiver; and a controller operatively coupled to the transmitter and the receiver, the controller being configured to detect when the wireless cellular communication device is within range of the transmitter, and upon detection that the wireless cellular communication device is within range of the transmitter, the controller being configured to automatically perform a base station registration process with the detected wireless cellular communication device using the communication protocol used by the wireless cellular communication device on the frequencies licensed for wide-area wireless networks, and, upon completion of the registration process, to cause the transmitter to transmit a coupon message from the retail facility to the wireless cellular communication device using the communication protocol used by the wireless cellular communication device to thereby permit direct communication between the retail facility and the wireless cellular communication device on the frequencies licensed for wide-area wireless networks.

2. The system of claim 1, further comprising a printing device located within the retail facility.

3. The system of claim 1, further comprising a scanning device located within the retail facility.

4. The system of claim 1 wherein the coupon message includes unique identification data.

5. The system of claim 1 wherein the coupon message includes symbology data.

6. The system of claim 1 wherein the coupon message includes coupon expiration data.

7. The system of claim 1 wherein the transmitter and receiver are configured for two-way communication with the consumer wireless device.

8. The system of claim 7 wherein the receiver is configured to receive an acknowledgement message from with the wireless cellular communication device to confirm receipt of the coupon message by the wireless cellular communication device.

9. The system of claim 1 wherein the transmitter is configured to transmit the coupon message to the wireless cellular communication device using a Short Message Service (SMS) protocol.

10. The system of claim 1, further comprising a network interface configured to communicate with a computer network external to the retail facility.

11. The system of claim 1, further comprising a network interface configured to communicate with a computer network within the retail facility.

12. The system of claim 1, further comprising a data storage structure configured to store data identifying the wireless cellular communication device and the coupon message transmitted to the wireless cellular communication device.

13. The system of claim 1 wherein the controller selects a coupon message for transmission to the wireless cellular communication device based on an identification of the wireless cellular communication device.

14. A retail coupon redemption method for use with frequencies licensed for wide-area wireless networks, the method comprising:
using a communication protocol for wide-area wireless networks to detect when a wireless cellular communication device moves within communication range of a fixed communication device having a transmitter and a receiver and associated with a retail facility open to consumers, the fixed communication device being configured for operation in accordance with the communications protocol;
upon detection that the wireless cellular communication device is within range of the fixed communication device, registering the wireless cellular communication device with the fixed communication device using frequencies licensed for wide-area wireless networks using a registration process in accordance with the communications protocol, and using the transmitter to transmit a coupon message from the retail facility to the wireless cellular communication device;
receiving the coupon message at the wireless cellular communication device; and
displaying the received coupon message on a display of the wireless cellular communication device.

15. The method of claim 14, further comprising storing the received coupon message in the wireless cellular communication device.

16. The method of claim 14, further comprising redeeming the coupon message within the retail facility.

17. The method of claim 16 wherein redeeming the coupon message comprises printing the coupon message at the retail facility.

18. The method of claim 16 wherein redeeming the coupon message comprises scanning a display of the wireless cellular communication device the coupon at the retail facility.

19. The method of claim 14 wherein the coupon message includes symbology data.

20. The method of claim 14 wherein the coupon message includes coupon expiration data.

21. The method of claim 14, further comprising transmitting an acknowledgment from the wireless cellular communication device to confirm receipt of the coupon message by the wireless cellular communication device.

22. The method of claim 14 wherein the transmitting the coupon message to the wireless cellular communication device uses a Short Message Service (SMS) protocol.

23. The method of claim 14, further comprising storing data identifying the wireless cellular communication device and identifying the coupon message transmitted to the wireless cellular communication device.

24. The method of claim 23, further comprising:
upon detection that the wireless cellular communication device is within range of the fixed communication device, querying the stored data to determine whether the coupon message has been previously transmitted to the wireless cellular communication device; and
transmitting the coupon message to the wireless cellular communication device only if the coupon message has not been previously transmitted to the wireless cellular communication device.

25. The method of claim 14, further comprising transmitting a plurality of coupon messages to the wireless cellular communication device.

26. The method of claim 14 wherein detecting when a wireless cellular communication device moves within communication range of a fixed communication device associated with a retail facility comprises detecting when a wireless cellular communication device moves within communication range of a plurality of fixed communication devices associated with a plurality of corresponding retail facilities; and
upon detection that the wireless cellular communication device is within range of the plurality of fixed communication devices, transmitting coupon messages from each of the plurality of corresponding retail facilities to the wireless cellular communication device.

27. The method of claim 14 wherein detecting when a wireless cellular communication device moves within communication range of a fixed communication device associated with a retail facility comprises detecting when each of a plurality of wireless cellular communication devices move within communication range of a fixed communication device associated with a retail facility; and
upon detection that each of the plurality of wireless cellular communication devices is within range of the fixed communication device, registering each of the plurality of wireless cellular communication devices with the fixed communication device using frequencies licensed for wide-area wireless networks and, upon completion of the registration process, transmitting a coupon message from the retail facility to each of the plurality of wireless cellular communication devices.

28. The method of claim 14, further comprising:
upon detection that the wireless cellular communication device is within range of the fixed communication device, sending an authorization request to obtain authorization to transmit the coupon message to wireless cellular communication device; and
transmitting the coupon message to the wireless cellular communication device only upon receipt of the authorization.

29. The method of claim 14, further comprising communicating with a computer network to obtain data related to the coupon message.

30. The method of claim 14, further comprising identifying the wireless cellular communication device and selecting the coupon message for transmission to the wireless cellular communication device based on the identification of the wireless cellular communication device.

31. The method of claim 14, further comprising selecting a customized coupon message for transmission to the wireless cellular communication device based on an identification of the wireless cellular communication device.

32. A retail coupon system for use with frequencies licensed for wide-area wireless network, the system comprising:
- a base station associated with a retail facility and located proximate the retail facility, the base station being configured to have a limited transmission range on the licensed frequencies and to communicate with a wireless cellular communication device using a wireless communication protocol; and
- a base station controller operatively coupled to the base station, the controller being configured to detect when the wireless cellular communication device is within range of the base station, and upon detection that the wireless device is within range, the controller being configured to:
  - perform a base station registration process with the wireless cellular communication device using the wireless communication protocol used by the wireless cellular communication device, and
  - cause the base station to transmit a coupon message to the wireless cellular communication device.

33. The system of claim 32 wherein the wireless cellular communication device is a subscriber to the wide-area wireless network, and the base station registration process utilizes the registration protocol of the subscriber wireless network.

34. The system of claim 32 wherein the base station controller is further configured to select a customized coupon message for transmission to the wireless cellular communication device based on an identification of the wireless cellular communication device.

35. A retail coupon system for use with a plurality of retail facilities operating on frequencies licensed for wide-area wireless networks, the system comprising:
- a plurality of base stations, each associated with a respective one of the plurality of retail facilities and located proximate the respective retail facility, each of the plurality of base stations being configured to have a limited transmission range on the licensed frequencies to thereby define a cellular coverage region for each respective base station and to communicate with wireless cellular communication devices operating on frequencies licensed for wide-area wireless networks; and
- a base station controller operatively coupled to each of the plurality of base stations, the controller being configured to detect when the wireless cellular communication device is within range of a first of the plurality of base stations, and upon detection that the wireless cellular communication device is within range, the controller operatively coupled to the first base station being configured to:
  - perform a base station registration process with the wireless cellular communication device, and
  - cause the first base station to transmit a coupon message to the registered wireless cellular communication device.

36. The system of claim 35 wherein the wireless cellular communication device is a subscriber to the wide-area wireless network, and the base station registration process utilizes the registration protocol of the subscriber wireless network.

37. The system of claim 35 wherein a second base station controller operatively coupled to a second one of the plurality of base stations detects that the wireless cellular communication device is within range of the second base station, the second controller being configured to perform a base station registration process with the wireless cellular communication device such that the wireless cellular communication device is now registered with the second base station instead of the first base station.

38. The system of claim 35 wherein at least one of the base station controllers is further configured to select a customized coupon message for transmission to the wireless cellular communication device based on an identification of the wireless cellular communication device.

* * * * *